US007697805B2

(12) United States Patent
Kobayashi et al.

(10) Patent No.: US 7,697,805 B2
(45) Date of Patent: Apr. 13, 2010

(54) FIBER BRAGG GRATING SYSTEM HAVING A THERMO MODULE FOR SUPPLYING OR ABSORBING HEAT TO OR FROM AN FBG MODULE

(75) Inventors: Shuko Kobayashi, Kanagawa (JP); Kensuke Sasaki, Kanagawa (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 216 days.

(21) Appl. No.: 11/806,915

(22) Filed: Jun. 5, 2007

(65) Prior Publication Data
US 2008/0107379 A1 May 8, 2008

(30) Foreign Application Priority Data
Jun. 6, 2006 (JP) ............................. 2006-157116

(51) Int. Cl.
*G02B 6/34* (2006.01)
(52) U.S. Cl. ...................................... 385/37
(58) Field of Classification Search ................. None
See application file for complete search history.

(56) References Cited
U.S. PATENT DOCUMENTS
7,127,140 B2 * 10/2006 Kobayashi et al. ............ 385/37

| 7,302,122 | B2 * | 11/2007 | Hashimoto et al. | 385/12 |
| 2003/0138197 | A1 * | 7/2003 | Wakabayashi et al. | 385/27 |
| 2004/0264965 | A1 * | 12/2004 | Kobayashi et al. | 398/78 |
| 2006/0056764 | A1 * | 3/2006 | Adachi et al. | 385/37 |

FOREIGN PATENT DOCUMENTS
| JP | 2005-173246 | | 6/2005 |
| JP | 2005173246 A | * | 6/2005 |
| JP | 3795064 B2 | | 7/2006 |
| WO | WO-97/26572 | | 7/1997 |

* cited by examiner

Primary Examiner—Michelle R Connelly Cushwa
(74) Attorney, Agent, or Firm—Rabin & Berdo, P.C.

(57) ABSTRACT

An FBG system with lower power supplied to a temperature controller, while allowing for precise temperature control of an FBG grating. The FBG system includes a high temperature FBG-mounting structure and a low temperature FBG-mounting structure, and a housing containing them. The high temperature FBG-mounting structure includes an FBG module and a thermo module. The temperature of the FBG in the FBG module may be made higher than the environmental temperature by supplying heat from a heat-conducting portion to the thermo module. The low temperature FBG-mounting structure includes an FBG module and a thermo module. The temperature of the FBG in the latter FBG module may be made lower than the environmental temperature by supplying heat from the latter thermo module to the heat-conducting portion. The FBG-mounting structures are provided in parallel on the inner bottom surface of the heat-conducting portion, part of the housing.

16 Claims, 8 Drawing Sheets

FIBER BRAGG GRATING SYSTEM HAVING A THERMO MODULE FOR SUPPLYING OR ABSORBING HEAT TO OR FROM AN FBG MODULE

BACKGROUND OF THE INVENTION

1. Field of the Invention

The present invention relates to a fiber Bragg grating (FBG) system, for use in an encoder or a decoder in an optical code division multiplex transmission system, and particularly to an FBG system that may control the Bragg reflection wavelength.

2. Description of the Background Art

The recent spread of the Internet or the like has rapidly increased communication demand. Accordingly, a high speed and large capacity network using an optical fiber or the like has started to be built. One communication means that has gained attention for constructing a high speed and large capacity optical network is an optical code division multiplex (OCDM) transmission.

In the OCDM transmission, plural channels of optical pulse signals are generated by optically modulating an optical pulse train to thereby convert electrical pulse signals into optical pulse signals and encoded with codes different from channel to channel, and the plural channels of optical pulse signals are decoded by a decoder on the receiver side into the original optical pulse signals with the same codes as used in the encoding on the transmitter side. Light for conveying optical pulse signals may sometimes be referred to as an optical carrier.

The OCDM transmission may convey optical pulse signals on a large number of channels simultaneously on the same wavelength. The OCDM transmission system uses one and the same code between the transmitter and receiver sides as a key, as which referred to may be a code that is set in the encoder and decoder, thus being higher in security for transmission as is one of the features.

One of the known encoding measures in OCDM is, for example, a phase coding OCDM, which uses an optical phase as a code. Specifically, the encoder and decoder use the super structured fiber Bragg grating (SSFBG). Another one of the known encoding measures in the OCDM system, in addition to one using the phase coding, includes a system using a wavelength hopping code. For any of the above encoding measures, a change in the Bragg reflection wavelength of the SSFBG system used in an encoder and a decoder caused by fluctuation in ambient temperature surrounding the SSFBG grating or the like has to be prevented, as will be described below.

The OCDM transmission uses, for any of the above encoding schemes, one and the same code as a key on the transmission and receiver sides. In the following discussion, for simplicity, the SSFBG may sometimes be abbreviated only as FBG.

For a better understanding of the present invention, a reference will now be made to schematic block diagrams of FIGS. 1 and 2 to describe the configuration of a general OCDM transmission system and an FBG grating for use in an encoder and a decoder in the OCDM transmission system. FIG. 1 schematically shows the configuration of an OCDM transmission system. FIG. 2 shows an FBG made of a 15-bit code where fifteen unit FBGs are arranged in the order of "ABCDEFGHIKLMNOP." The FBG shown in FIG. 2 includes an optical fiber 6 that includes an SSFBG forming section 8 having the fifteen unit FBGs arranged serially in its waveguide direction.

The OCDM transmission system includes a transmitter section 10 and a receiver section 40, which are interconnected by a transmission line 42. Signals transmitted by the OCDM transmission system are of optical pulses. Optical pulse signals are binary digital signals that carry information to be transmitted. The optical pulse signals may, for example, be generated in the form of return-to-zero (RZ) type of optical pulse signals.

The transmitter section 10 includes an optical pulse train generator 12, a signal generator 14, an optical modulator 16, a first optical circulator 18, and an encoder 60. The optical pulse train generator 12 generates an optical pulse train 13. The signal generator 14 supplies the optical modulator 16 with information to be transmitted in the form of binary digital electrical pulse signal 15.

The optical modulator 16 outputs an optical pulse signal 17 to be transmitted, which is then input via the first optical circulator 18 to the encoder 60. The encoder 60 produces and sends an encoded optical pulse signal via the first optical circulator 18 in the form of optical pulse signal 19 to the transmission line 42, the optical pulse signal being in turn sent over the transmission line 42 to the receiver section 40.

The receiver section 40 includes a second optical circulator 22, a decoder 62, an optical coupler 26, an optoelectrical converter 28, a wavelength monitor 30, and a wavelength controller 32. The optoelectrical converter 28 converts an optical pulse signal 27 into a corresponding electrical pulse signal 36. The wavelength monitor 30 measures the degree of autocorrelation, or the amplitude of eye opening, of an optical pulse signal 29. The wavelength controller 32 receives an output 31 from the wavelength monitor 30 and supplies a control signal 67 to a temperature controller 68. The temperature controller 68, when received the control signal 67, is responsive to the control signal 67 to control, via a cable 69, the current of a thermo module 66 so as to regulate, i.e. increase or decrease, the FBG temperature.

The transmission line 42 conveys an optical pulse signal 21, which is in turn input via the second optical circulator 22 to the decoder 62 where the optical pulse signal 21 is decoded. The decoded optical pulse signal is sent back to the second optical circulator 22 and further to the optical coupler 26 where the optical pulse signal is split into optical pulse signals 27 and 29. The one optical pulse signal 27 is restored by the optoelectrical converter 28 into the corresponding electrical pulse signal 36. In this way, the binary digital electrical pulse signal 15 that carries information to be transmitted is received and restored by the receiver section 40 to the binary digital electrical pulse signal 36.

The decoder 62 has a temperature sensor 64 thereon that regularly measures the temperature of the FBG included in the decoder 62 and sends a measurement to the temperature controller 68 in the form of temperature signal 65. The wavelength controller 32 is responsive to the output 31 from the wavelength monitor 30 to calculate a temperature value to be set for the FBG. To achieve the calculated temperature, the temperature control signal 67 is supplied to the temperature controller 68.

Between the encoder 60 and the decoder 62, the FBGs are the same as each other in effective refractive index periodic structure but opposite to each other in periodic structure. Specifically, when the FBGs included in the encoder 60 and the decoder 62 have, as shown in FIG. 2, the fifteen unit FBGs arranged in the order of "ABCDEFGHIKLMNOP," and the FBG included in the encoder 60 has its input/output port set on the side of the unit FBG denoted by "A", the FBG included in the decoder 62 will have its input/output port set on the side of the unit FBG denoted by "P".

The FBGs included in the encoder or decoder have the Bragg reflection wavelength, which may hereafter be referred to as "operating wavelength" and depends on the ambient temperature or the like. Suppose here that some cause such as an ambient temperature change gives rise to a difference in effective refractive index periodic structure of the FBGs between the encoder 60 and the decoder 62, thus providing the different operating wavelengths. Under that circumstance, it is necessary to control the FBG temperature so as to render the effective refractive index periodic structure of the FBG forming the effective refractive index periodic structure of the decoder 62 identical to the effective refractive index periodic structure of the FBG included in the encoder 60.

When installing FBGs in an encoder and a decoder, it is practically difficult to set the operating wavelength identical between the encoder and the decoder.

In order that the operating wavelength is always maintained identical between the FBGs included in an encoder on the transmitter side and an decoder on the receiver side, the operating wavelength of the FBG needs to be adjusted on at least either of the encoder and decoder.

With the phase coding OCDM transmission, when the FBG included in an encoder on the transmitter side has its operating wavelength that differs by several-ten picometer (pm) or more from the operating wavelength of the FBG included in a decoder on the receiver side, the receiver side may not decode successfully. This means that adjustment is always necessary on the wavelength of the FBGs included in the encoder on the transmitter side and the decoder on the receiver side so as to have the Bragg reflection wavelengths differ by less than several-ten picometer.

An FBG system has then been proposed which is so designed that the FBG may have its Bragg reflection wavelength hard to be affected by a change in ambient temperature, for example, by an international publication, WO 97/26572.

The international publication discloses a system that includes a negative thermal expansion substrate and an optical fiber provided on its surface at least two positions spaced apart from each other. The optical fiber includes an FBG. Now, with reference to FIG. 3, a description will be made of the dependency of the operating wavelength on a change in ambient temperature in the FBG system disclosed in the international publication. The x axis indicates the ambient temperature in degree centigrade (° C.) and the y axis the operating wavelength in nanometer (nm) of the FBG system. A straight line denoted by "a" corresponds to the FBG that is not fastened on the negative thermal expansion substrate. Another straight line denoted by "b" corresponds to the FBG that is fastened on the negative thermal expansion substrate and included in the FBG system. The operating wavelength of the FBG system refers to the peak wavelength of the Bragg reflection of the FBG forming the FBG system.

For the ambient temperature changing from 40 degree centigrade below zero to 125 degree centigrade above zero, the line denoted by "a" for an FBG that is not fastened on the negative thermal expansion substrate has its operating wavelength equal to 1563.75 nm at −40 degree centigrade, while 1565.65 nm at +125 degree centigrade, providing a difference of 1.9 nm therebetween. In contrast, the line denoted by "b" for the FBG that is fastened on the negative thermal expansion substrate and included in the FBG system has its operating wavelength variable in a range between 1565.5 nm and 1565.7 nm with a smaller difference equal to 0.2 nm, i.e. 200 pm. Specifically, an FBG fastened on the negative thermal expansion substrate and included in the FBG system may have its operating wavelength controlled with a change limited to 0.2 nm.

When the FBG system is used as an encoder and a decoder in the OCDM system, however, the change of 0.2 nm in operating wavelength due to an ambient temperature variation is too large to make the FBG system available as an encoder and a decoder. In the system disclosed in the international publication, once the FBG-incorporating optical fiber is fastened on an FBG system, the operating wavelength may not be controlled to any value by an external instruction. The OCDM optical communication involves a problem that when a light source for generating optical pulse signals to be sent from a transmitter side has fluctuation in wavelength or the like, it is hard to control the operating wavelength to compensate for the fluctuation.

For the purpose of solving the above problems, an FBG system has been developed which has a function of being responsive to an instruction from an external to control the temperature, when the FBG system for use in an encoder and a decoder has variations in its operating wavelength due to fluctuations in ambient temperature or when the light source for generating optical pulse signals to be sent from the transmitter side fluctuates in wavelength, to convert the operating wavelength to any wavelength with its adjustable range equal to 200 pm or more, and to finely adjust the operating wavelength with an accuracy of 1 pm, as is disclosed by, for example, Japanese patent laid-open publication No. 2005-173246.

The FBG system disclosed by the Japanese '246 publication features a control that causes little variation in operating wavelength even when the ambient temperature varies. It does however face the following problems when the FBG system is fabricated as an encoder and a decoder in the OCDM transmission system.

The OCDM transmission system is generally adapted to allow for one-way transmission, as shown in FIG. 1, from one terminal, transmitter section 10, to another terminal, receiver section 40, as well as both-way transmission. Each terminal thus includes transmitter and receiver sections, so that the encoder and decoder are disposed in close proximity to each other. It would therefore be expected that separate temperature control between the encoder and the decoder consumes more power. Specifically, when the terminal including the encoder and decoder in close proximity encounters an increase or decrease in ambient temperature, the encoder and decoder both experience the same control, and the temperature control in the encoder and decoder interact with each other, thus consuming more power in temperature control of the encoder and decoder.

For example, an abrupt increase in ambient temperature causes the temperature controller to decrease the temperature of the FBGs included in both encoder and decoder. Both encoder and decoder thus release more heat, requiring more power to be supplied to both temperature controllers. The same holds true for an abrupt drop in ambient temperature. Both encoder and decoder need to be supplied with power, thus also requiring more power to be supplied to both temperature controllers.

As described above, when the encoder and decoder are provided in close proximity to each other and thus release more heat, the heat releasing or absorbing sections of the encoder and decoder are in close proximity accordingly, hence causing a larger temperature increase of the heat releasing or absorbing sections than when they are disposed alone. Accordingly, the temperature controllers for the encoder and decoder may bear more burden. That is also the case with an abrupt drop in ambient temperature.

SUMMARY OF THE INVENTION

It is therefore an object of the present invention to provide an FBG system that may restrict electric power consumed by a temperature controller while allowing for precise temperature control in a communication terminal having its encoder and decoder disposed in close proximity to each other.

It is another object of the present invention to provide an FBG system that can restrict electric power consumed by a temperature controller included not only in a single set of encoder and decoder but also more generally in respective encoders or decoders which form FBG gratings included in plural encoders and plural decoders, which may not necessarily be of the same plurality, while allowing for accurate temperature control of the FBGs.

An FBG system according to one aspect of the invention includes a plurality of FBG-mounting structures and a housing that contains the FBG-mounting structures. The FBG-mounting structure includes an FBG module with an FBG mounted thereon and a thermo module that supplies or absorbs heat from the FBG module. The FBG-mounting structures are provided in parallel on the inner bottom surface of the heat-conducting portion, part of the housing. The adjacently provided FBG-mounting structures have temperature values set such that one is lower than the environmental temperature and another is higher than the environmental temperature.

An FBG system according to another aspect of the invention includes two FBG-mounting structures and a housing that contains the FBG-mounting structures. The FBG-mounting structure includes an FBG module with an FBG mounted thereon and a thermo module that supplies or absorbs heat from the FBG module. A plate heat conductor is provided on the inner bottom surface of the housing with both side walls of the heat conductor unparallel to the inner bottom surface. The two FBG-mounting structures are provided on both side walls of the heat conductor, respectively. The FBG-mounting structures have temperature values set such that one is lower than the environmental temperature and another is higher than the environmental temperature.

An FBG system according to a further aspect of the invention includes a plurality of FBG-mounting structures and a housing that contains the FBG-mounting structures. The FBG-mounting structure includes an FBG module with an FBG mounted thereon and a thermo module that supplies or absorbs heat from the FBG module. A polygonal prism-shaped heat conductor is provided on the inner bottom surface of the housing. The FBG-mounting structures are provided on respective side walls of the heat conductor. The adjacently provided FBG-mounting structures have temperature values set such that one is lower than the environmental temperature and another is higher than the environmental temperature.

An FBG system according to still another aspect of the invention includes a plurality of FBG-mounting structures and a housing that contains the FBG-mounting structures. The FBG-mounting structure includes an FBG module with an FBG mounted thereon and a thermo module that supplies or absorbs heat from the FBG module. A polygonal prismoid-shaped heat conductor is provided on the inner bottom surface of the housing. The FBG-mounting structures are provided on respective side walls of the heat conductor. The adjacently provided FBG-mounting structures have temperature values set such that one is lower than the environmental temperature and another is higher than the environmental temperature.

The set temperature value refers to a temperature of the FBG at which the Bragg reflected light having its wavelength as designed is output and the phase of the input light is modulated as designed to be output.

In the above-described FBG systems, it is preferable that the FBG-mounting structure includes an FBG module which includes a mounting plate and a mounting plate holder, a temperature control plate which includes a heat or thermal insulating member and a thermo module, and a temperature sensor which senses the temperature of the mounting plate, and the structure is configured in the manner to read as follows.

An FBG contacting portion is provided on an upper surface of the mounting plate. A first fastening portion and a second fastening portion are provided at both ends of the mounting plate on opposite sides across the FBG contacting portion, respectively. The FBG is fastened on the first fastening portion and second fastening portion to be in contact with the FBG contacting portion.

The mounting plate has a lower surface that is in contact with the upper surface of the mounting plate holder in a slidable manner. The mounting plate holder has a lower surface that is fastened in contact with the temperature control surface of the temperature control plate. The heat absorbing and releasing surface of the temperature control plate opposite the temperature control surface is fastened in contact with the inner bottom surface of the heat-conducting portion or a side of the heat conductor.

In the FBG system according to the first aspect of the invention, the plurality of FBG-mounting structures are provided in parallel on the inner bottom surface of the heat-conducting portion, and ones of the FBG-mounting structures that are adjacently provided to each other have temperature values set such that one is lower than the environmental temperature and another is higher than the environmental temperature. In the following discussion, the FBG-mounting structure with the set temperature lower than the environmental temperature may be referred to as a low temperature FBG-mounting structure, and conversely, the FBG-mounting structure with the set temperature higher than the environmental temperature may be referred to as a higher temperature FBG-mounting structure.

Adjusting the control system such as a thermo module for temperature control of the FBG so as to bring the temperature of the FBG included in the FBG-mounting structure to be substantially equal to a set temperature value is referred to as setting a set temperature value for the FBG-mounting structure. More specifically, when the ambient temperature is higher than a temperature value set for the FBG-mounting structure, the temperature of the FBG in the FBG-mounting structure needs to be decreased, and conversely, when the ambient temperature is lower than the temperature value set for the FBG-mounting structure, the temperature of the FBG in the FBG-mounting structure needs to be increased. When the ambient temperature is substantially equal to the set temperature value for the FBG-mounting structure, control is made such that the temperature of the FBG in the FBG-mounting structure needs to be maintained.

The Bragg reflected light wavelength of the FBG or the modulation index of the phase of an input light depends on the refractive index of the core of an optical fiber in which the FBG is formed. More strictly speaking, it is determined by the effective refractive index $n_{\mathit{eff}}$ of an optical fiber considered as an optical waveguide. Specifically, with the FBG period of $\Lambda$ (upperlambda), the wavelength of the Bragg reflected light $\lambda_B$ is given as $\lambda_B = 2n_{\mathit{eff}}\Lambda$. The modulation index of the phase of the input light depends on the pitch or interval of the unit FBGs included in the SSFBG. To the geometrical length L of the interval, the optical length corresponding will be given by $n_{eff}L$.

It is known that the effective refractive index $n_{eff}$ of an optical fiber depends on the temperature of the optical fiber, i.e. the temperature of the FBG, and the dependency of the $n_{eff}$ on a temperature change is given as a quantitative relationship, see, for example, Andreas Othonos and Kyriacos Kalli, "Fiber Bragg Gratings". Therefore, if the temperature of an FBG during use of the FBG system is determined in advance, then the period $\Lambda$ of the FBG may be uniquely determined. More specifically, the temperature of an FBG given when designed will determine the value of $n_{eff}$, so that the value of $\Lambda$ when the Bragg reflection wavelength is equal to $\lambda_B$ is uniquely determined as a design value. The temperature of the FBG given when designed is a set temperature value. Because the FBG system is used while the temperature of the FBG-mounting structure is substantially equal to the temperature of the FBG included in the FBG-mounting structure, the temperature of the FBG may hereafter be referred to as the temperature of the FBG-mounting structure in which the FBG is included.

The environmental temperature refers to the range covering the minimum through the maximum of the ambient temperature assumed when the FBG system is used. The set temperature value that is lower than the environmental temperature thus refers to a temperature that is not more than but close to the minimum of the assumed ambient temperature. The set temperature that is higher than the environmental temperature thus refers to a temperature that is not less than but close to the maximum of the assumed ambient temperature.

Therefore, when the adjacently provided FBG-mounting structures have the temperature values set such that one is lower than the environmental temperature (the low temperature FBG-mounting structure) and another is higher than the environmental temperature (the high temperature FBG-mounting structure), an increase and a decrease in ambient temperature cause the same temperature control where the temperature of the low temperature FBG-mounting structure is decreased and the temperature of the high temperature FBG-mounting structure is increased. Therefore, the temperature control where the temperature of the low temperature FBG-mounting structure is decreased and the temperature of the high temperature FBG-mounting structure is increased will supply heat from the low temperature FBG-mounting structure to the heat-conducting portion on which the high- and low-temperature FBG-mounting structures are provided, while supplying heat from the heat-conducting portion to the high temperature FBG-mounting structure.

For the low temperature FBG-mounting structure, therefore, the heat-conducting portion always functions as the low temperature side, and for the high temperature FBG-mounting structure, the heat-conducting portion always functions as the high temperature side. More specifically, heat supplied from the low temperature FBG-mounting structure to the heat-conducting portion is effectively used to increase the temperature of the high temperature FBG-mounting structure. Lower power may thus be supplied to the temperature controller that controls the temperature of the high- and low-temperature FBG-mounting structures. Lower power to be supplied to the temperature controller generally means the effective use of the temperature control function of the temperature controller, thus facilitating the precise control on the temperature of the high- and low-temperature FBG-mounting structures.

In the FBG system according to the second aspect of the invention, two FBG-mounting structures, i.e. the low and high temperature FBG-mounting structures, each having the FBG mounted thereon are provided on both side walls of a plate heat conductor, respectively. The thickness of the heat conductor may be sufficiently small so that the heat released from the low temperature FBG-mounting structure may be transferred to the high temperature FBG-mounting structure more efficiently. Therefore, much lower power may be supplied to the temperature controller that controls the temperature of the high- and low-temperature FBG-mounting structures than in the FBG system according to the first aspect of the invention. Note, however, that the plate heat conductor, which is not needed in the first FBG system, needs to be provided on the inner bottom surface of the housing, thus providing more complicated configuration, accordingly.

Because it is not necessary that the low and high temperature FBG-mounting structures be provided in parallel (to provide the FBGs in parallel), both side walls of the plate heat conductor may not be accurately parallel. Although the low and high temperature FBG-mounting structures are preferably provided on opposite side walls of the heat conductor at symmetrical positions, respectively, they may not be provided at the accurately symmetrical positions. Nevertheless, it is still possible to efficiently transfer the heat released from the low temperature FBG-mounting structure to the high temperature FBG-mounting structure as described above.

In the FBG system according to the third aspect of the invention, the plurality of FBG-mounting structures each having the FBG mounted thereon are provided on the respective side walls of a polygonal prism-shaped heat conductor. Therefore, compared to the FBG system according to the first aspect where the plurality of FBG-mounting structures are provided on the inner bottom surface of the housing, the FBG-mounting structures may be provided in closer proximity. Therefore, much lower power may be supplied to the temperature controller that controls the temperature of the high and low temperature FBG-mounting structures. Note, however, that the polygonal prism-shaped heat conductor, which is not needed in the first FBG system, needs to be provided on the inner bottom surface of the housing, thus providing more complicated configuration, accordingly.

In the FBG system according to the fourth aspect of the invention, the plurality of FBG-mounting structures each having the FBG mounted thereon are provided on the respective side walls of a polygonal prismoid-shaped heat conductor. Because it is not necessary that the FBG-mounting structures be provided in parallel (to provide the FBGs in parallel), the shape of the heat conductor is not limited to the polygonal prism, but may be polygonal prismoid-shaped. Even for the polygonal prismoid-shaped heat conductor, the same effect is achieved as in the third FBG system.

The FBG-mounting structure included in those FBG systems may be configured as described above to bring the lower surface of the mounting plate into contact with the upper surface of the mounting plate holder in a slidable manner, thus the expansion and contraction due to the thermal expansion of the mounting plate holder will not be transmitted to the mounting plate. Specifically, the mounting plate holder and the mounting plate may be made of materials having different thermal expansion coefficients without applying any distortion to the mounting plate from the thermal expansion of the mounting plate holder.

The temperature control plate includes the heat insulating member and the thermo module, the lower surface of the mounting plate holder is fastened in contact with the temperature control surface of the temperature control plate, and a heat-releasing surface or a heat-absorbing surface of the temperature control plate opposite the temperature control surface is fastened in contact with the inner bottom surface of the housing, which is the heat-conducting portion, or a side of the heat conductor. The heat released from the thermo module included in the low temperature FBG-mounting structure is supplied via the heat-releasing surface to the heat-conducting portion or the heat conductor. The heat-conducting portion or the heat conductor supplies heat via the heat-absorbing surface to the thermo module included in the high temperature FBG-mounting structure. Whether the surface of the temperature control plate opposite the temperature control surface is the heat-releasing surface or the heat-absorbing surface depends on whether the thermo module is included in the low temperature FBG-mounting structure or the high temperature FBG-mounting structure. Specifically, the surface of the temperature control plate opposite the temperature control surface, which plate is provided on the low temperature FBG-mounting structure, is the heat-releasing surface, and the surface of the temperature control plate opposite the temperature control surface, which plate is provided on the high temperature FBG-mounting structure, is the heat-absorbing surface.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
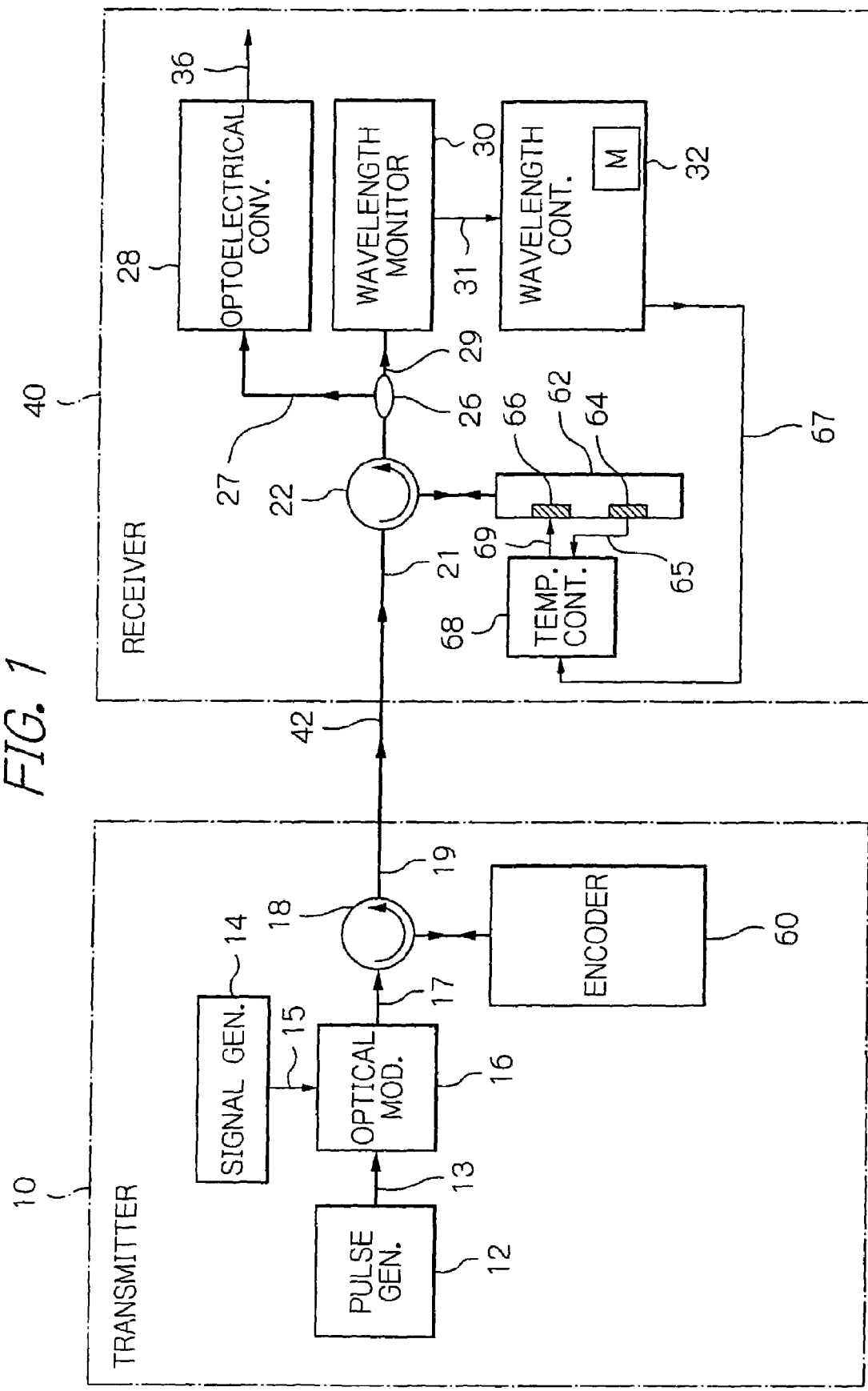
FIG. 1 is a schematic block diagram showing the configuration of an optical code division multiplex transmission system to which the present invention is applied.
Figure 2:
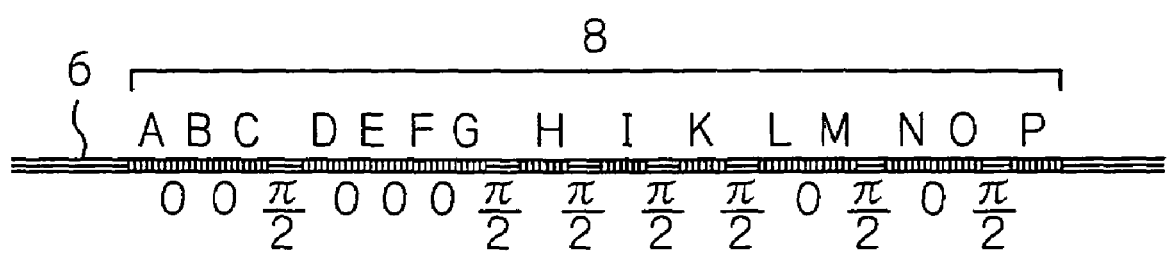
FIG. 2 schematically shows an exemplified structure of an FBG grating formed with a 15-bit code train.
Figure 3:
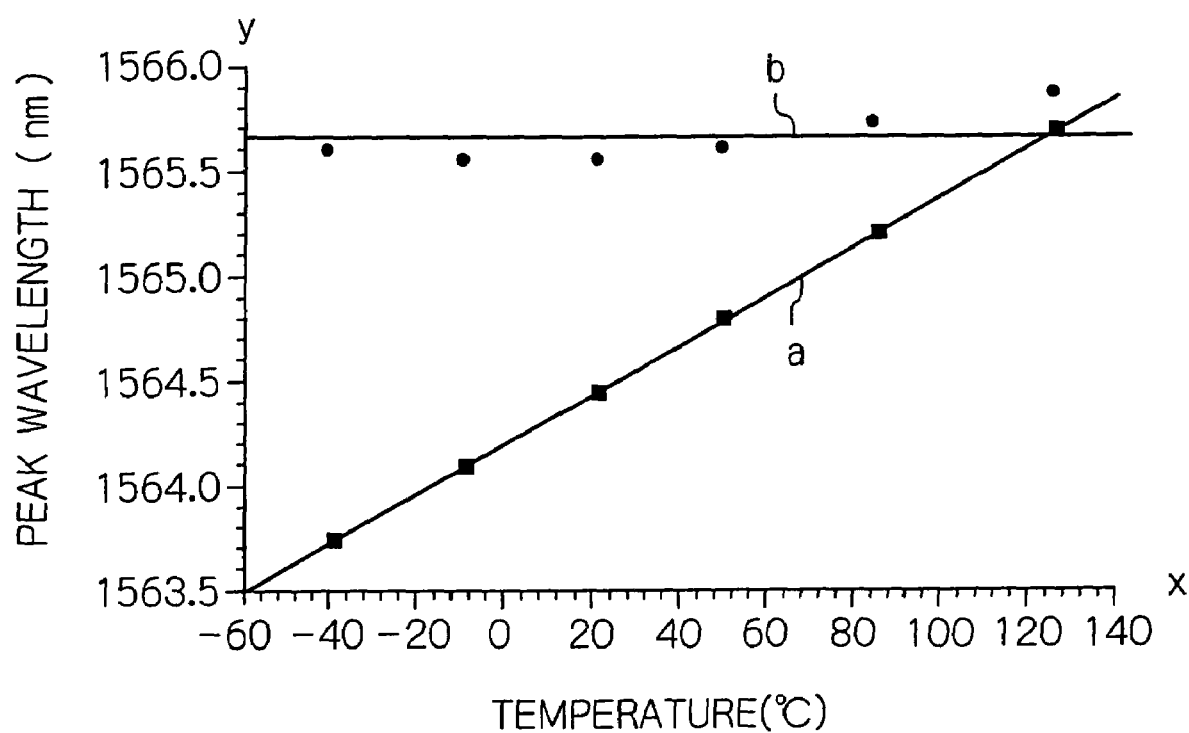
FIG. 3 plots the Bragg reflection peak wavelength dependent upon the temperature in a conventional FBG system.

Referring to the accompanying drawings, preferred embodiments of the present invention will be described below. The figures of the drawings show illustrative embodiments of the invention, and are merely intended to schematically show the cross-section, arrangement or the like of the components of the embodiments to the extent that the present invention can be well understood, and therefore should not be comprehended as limiting the invention thereby. In the following discussion, specific materials and conditions or the like may be used, but are only illustrative, and the present invention is not limited thereto. Throughout the entire application, like components are designated by the same reference numerals, and their redundant description may be omitted. In the figures illustrating the FBG (fiber Bragg grating)-mounting structure and other embodiments, priority may be given to the simplicity in viewing and understanding the figures so as to roughly draw the portions viewed geometrically overlapped or so in the perspective direction of the figures to the extent that the spirit of the present invention is not misunderstood.

Figure 4A:
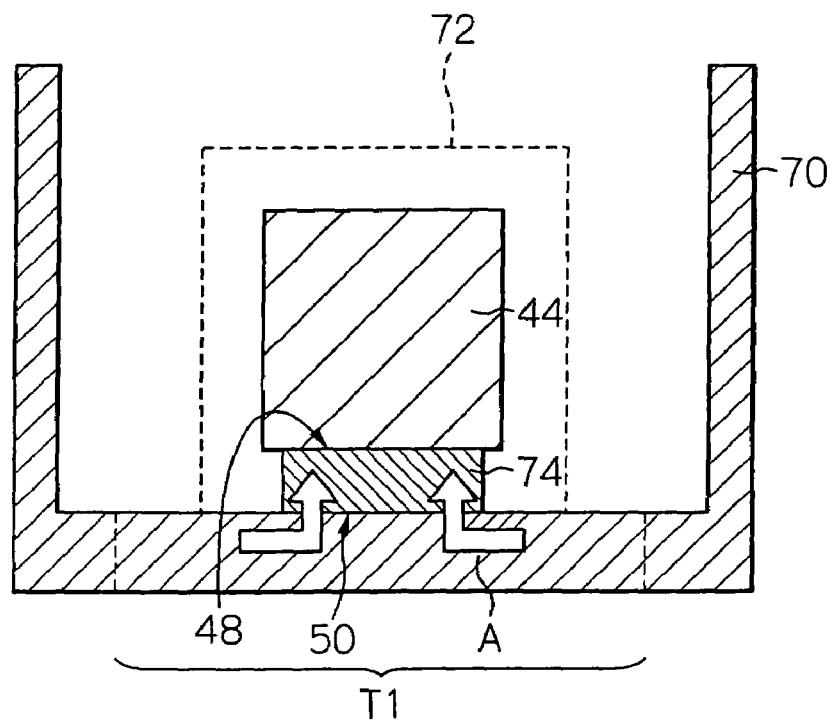
FIG. 4A is a schematic cross-sectional view useful for understanding how heat is conducted between a single high-temperature FBG-mounting structure provided in a housing and the housing.
Figure 4B:
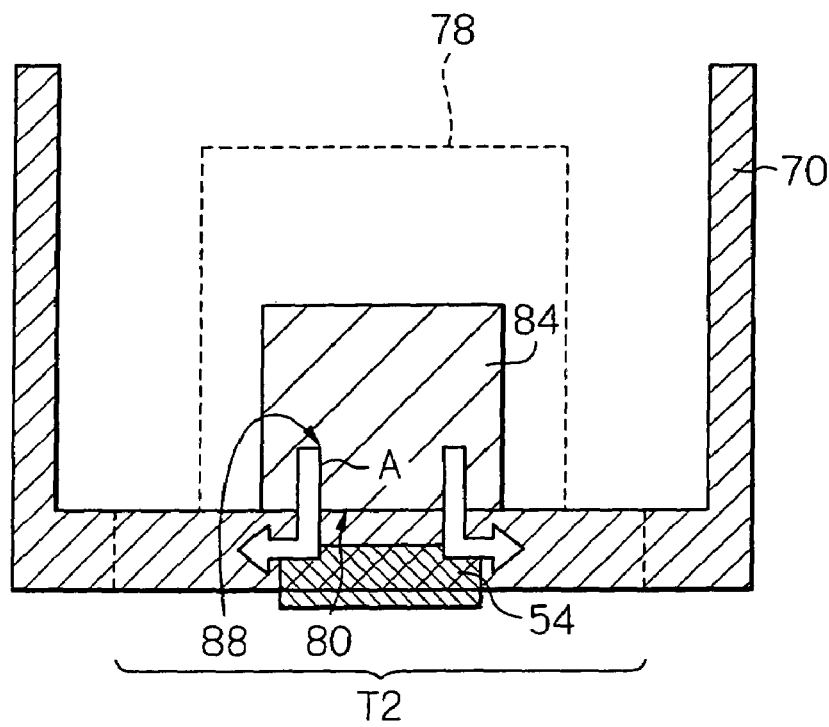
FIG. 4B is a schematic cross-sectional view, similar to FIG. 4A, for the case of single low-temperature FBG-mounting structure provided in a housing.
Figure 5:
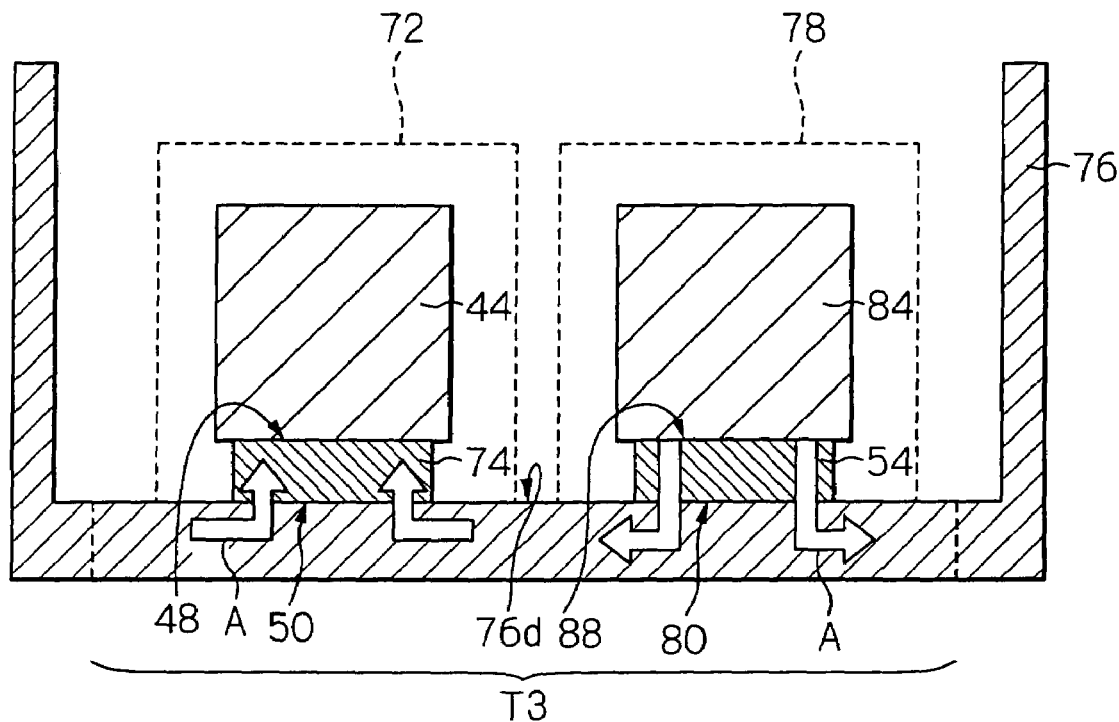
FIG. 5 illustrates, in a side cross-sectional view, a first embodiment where the high- and low-temperature FBG-mounting structures are provided in a common housing.

For a better understanding of the first illustrative embodiment, FIGS. 4A and 4B will be referred to in order to describe the heat conduction between an FBG-mounting structure 72 or 78 and its housing 70. FIGS. 4A and 4B are directed to a case in which a single FBG-mounting structure 72 or 78 is provided within the housing 70 for describing how the heat is transferred between the FBG-mounting structure 72 or 78 and the housing 70. Specifically, FIG. 4A is useful for understanding the heat conduction between the high temperature FBG-mounting structure 72 and the housing 70. FIG. 4B is for understanding the heat conduction between the low temperature FBG-mounting structure 78 and the housing 70. In the figures, hollow arrows A denote heat flows. In FIG. 5, which we will refer to in the following discussion, the hollow arrows indicate heat flows.

With reference to FIG. 4A, the high temperature FBG-mounting structure 72 includes an FBG module 44 and a thermo module 74. In order for the FBG grating in the FBG module 44 to have a temperature higher than a set temperature value, set higher than the environmental temperature, the structure 72 is supplied with heat via the thermo module 74 from a heat-conducting portion that is part of the housing 76. The thermo module 74 may include, for example, a Peltier device. In the following discussion, the thermo module is assumed to be a Peltier device.

When the thermo module 74 is in operation, a temperature control surface 48 of the thermo module 74 increases its temperature, and a heat-absorbing surface 50 decreases its temperature. Specifically, the thermo module 74 operates to allow heat to be supplied from the heat-conducting portion via the heat-absorbing surface 50 to the thermo module 74. The heat is then supplied via the temperature control surface 48 to the FBG module 44. Because the heat-conducting portion supplies heat, it decreases its temperature. For the high temperature FBG-mounting structure 72 provided, the heat-conducting portion serves as a sort of heat source.

The heat-conducting portion refers to an area or part immediately below and surrounding such a portion of the inner bottom surface of the housing 70 which supports the heat-absorbing surface 50 of the thermo module 74 immediately below the module 74. In FIG. 4A, the area is generally denoted by the symbol $T_1$. The heat-conducting portion in FIG. 4A refers to a portion that significantly changes its temperature when the thermo module 74 operates. Quantitative definition of that portion may be meaningless. Specifically, from the point of view of supplying heat to the thermo module 74, it should be understood that a portion of the bottom surface of the housing 76 that may act as the heat source is referred to as a heat-conducting portion.

As shown in FIG. 4B, a low temperature FBG-mounting structure 78 includes an FBG module 84 and a thermo module 54. In order for the FBG in the FBG module 84 to have a temperature higher than a set temperature value, lower than the environmental temperature, the structure 78 is supplied with heat via the thermo module 54 from a heat-conducting portion that is part of the housing 76.

When the thermo module 54 is in operation, a temperature control surface 88 of the thermo module 54 increases its temperature, and a heat-releasing or radiating surface 80 decreases its temperature. Specifically, the thermo module 54 operates to allow heat to be supplied to the heat-conducting portion via the heat-releasing surface 80 from the thermo module 54. The heat supplied to the heat-conducting portion is what is supplied via the temperature control surface 88 from the FBG module 84 to the thermo module 54. The heat-conducting portion receives the released heat and increases its temperature. For the low temperature FBG-mounting structure 78 provided, the heat-conducting portion serves as the heat-absorbing portion.

Again, as in the high temperature FBG-mounting structure 72 described above, the heat-conducting portion refers to an area or part immediately below and surrounding such a portion of the inner bottom surface of the housing 70 which supports the heat-absorbing surface 80 of the thermo module 54 immediately below the module 54. In FIG. 4B, the area is generally denoted by the symbol $T_2$. The heat-conducting portion in FIG. 4B refers to a portion that significantly changes its temperature when the thermo module 74 operates. Quantitative definition of that portion may also be meaningless. Specifically, from the point of view of receiving heat released from the thermo module 54, such part of the bottom surface of the housing 76 that may act as the heat-absorbing portion is referred to as a heat-conducting portion.

Now, with reference to FIG. 5, a description will be given of an FBG system in the illustrative embodiment where two FBG-mounting structures 72 and 78 are provided within the housing 76. The illustrative embodiment shown in FIG. 5 is directed to the case where two FBG-mounting structures 72 and 78 are provided within a single or common housing 76. The figure also illustrates how the heat is transferred when the ambient temperature is between the set temperature values of those FBG-mounting structures 72 and 78.

The FBG system of the instant illustrative embodiment includes the FBG-mounting structures 72 and 78, and the housing 76 containing both FBG-mounting structures. The FBG-mounting structures 72 and 78 are the high- and low-temperature FBG-mounting structures 72 and 78, respectively, which are described with reference to FIGS. 4A and 4B, respectively. As shown in FIG. 5, the structures 72 and 78 are provided in parallel on the inner bottom surface 76*d* of the heat-conducting portion, a part of the housing 76. The heat-conducting portion of the instant illustrative embodiment refers to such a region or part of the inner bottom surface of the housing 76 immediately below the heat-releasing surface 80 of the thermo module 54 and its periphery, and to such a region or part of the inner bottom surface of the housing 76 immediately below the heat-absorbing surface 50 of the thermo module 74 and its periphery. In FIG. 5, the heat-conducting portion is a region generally denoted by the symbol $T_3$.

For the low temperature FBG-mounting structure 78, the heat-conducting portion $T_3$ always functions as the low temperature side. For the high temperature FBG-mounting structure 72, the heat-conducting portion $T_3$ always functions as the high temperature side. The heat supplied from the low temperature FBG-mounting structure 78 to the heat-conducting portion $T_3$ may thus be effectively utilized to increase the temperature of the high temperature FBG-mounting structure 72.

FIG. 5 shows the FBG system where only two FBG-mounting structures 72 and 78 are provided. However, pairs of high- and low-temperature FBG-mounting structures 72 and 78 may be alternately provided in parallel so as to allow the heat to be effectively conducted from the low temperature FBG-mounting structure 72 to the heat-conducting portion so as to increase the temperature of the high temperature FBG-mounting structure 78 in each pair. The number of pairs of FBG-mounting structures 72 and 78 to be provided is thus not limited to one, but the high- and low-temperature FBG-mounting structures 72 and 78 may alternately be provided in parallel so as to form two or more pairs of FBG-mounting structures 72 and 78 in the FBG system.

The inventors of the present patent application have analyzed heat conduction by means of the finite element method and confirmed that compared to the high temperature FBG-mounting structures 72 adjacently disposed to each other and to the low temperature FBG-mounting structures 78 adjacently disposed to each other, an alternate arrangement of the high- and low-temperature FBG-mounting structures 72 and 78 described above can allow lower power to be supplied to the temperature controller.

More specifically, the thermal analysis using the finite element method has confirmed that the high- and low-temperature FBG-mounting structures 72 and 78 adjacently, i.e. alternately, provided to each other can achieve a higher heat flow rate per unit cross-sectional area perpendicular to the heat flow direction in the heat-conducting portion $T_3$ than the high temperature FBG-mounting structures 72 adjacently provided to each other and also than the low temperature FBG-mounting structures 78 adjacently provided to each other. Specifically, the following phenomenon has been confirmed by thermal analysis using the finite element method.

In the instant illustrative embodiment where the high- and low-temperature FBG-mounting structures 72 and 78 are adjacently provided to each other, the heat-conducting portion $T_3$ immediately below the high temperature FBG-mounting structure 72 receives heat supplied from the heat-conducting portion $T_3$ immediately below the low temperature FBG-mounting structure 78, thus giving a smaller temperature variation in the entire heat-conducting portion $T_3$. When, in contrast, the high temperature FBG-mounting structures 78 are adjacently provided to each other, the heat-conducting portion $T_3$ supplies heat to both of the high temperature structures 78, thus decreasing the temperature of the entire heat-conducting portion $T_3$. When the low temperature FBG-mounting structures 72 are adjacently provided to each other, the heat-conducting portion $T_3$ receives heat supplied from both of the low temperature structures 72, thus increasing the temperature of the entire heat-conducting portion $T_3$.

Because in the low temperature FBG-mounting structure 78, the FBG included in the FBG module 84 has a temperature set lower than the environmental temperature, the FBG module 84 always needs to transfer heat to the heat-conducting portion $T_3$. Because the housing 76 is the same in temperature as the ambient temperature, the FBG included in the FBG module 84 has a temperature lower than the housing 76 temperature that substantially equals the ambient temperature. Specifically, the temperature control surface 88 of the thermo module 54 has a lower temperature than the heat-releasing surface 80. The closer the temperatures of the heat-releasing surface 80 and the temperature control surface 88, the smaller the power supplied to the thermo module 54. The lower, therefore, the temperature of the heat-releasing surface 80, the smaller the power supplied to the thermo module 54.

By contrast, in the high temperature FBG-mounting structure 72, because the FBG included in the FBG module 44 has a temperature set higher than the environmental temperature, it is necessary to always conduct the heat from the heat-conducting portion $T_3$ to the FBG module 44. The FBG included in the FBG module 44 has its temperature higher than the housing 76 temperature that equals the ambient temperature. Specifically, the temperature control surface 48 of the thermo module 74 has its temperature lower than the heat-absorbing surface 50. Again, the closer the temperatures of the heat-absorbing surface 50 and the temperature control surface 48, the smaller the power supplied to the thermo module 74. The lower, therefore, the temperature of the heat-absorbing surface 50, the smaller the power supplied to the thermo module 74.

As described above, the heat-conducting portion $T_3$ immediately below the low temperature FBG-mounting structure 78 is supplied with heat from the thermo module 54 via the heat-releasing surface 80, thus increasing the temperature of the structure 78. In contrast, the heat-conducting portion $T_3$ immediately below the high temperature FBG-mounting structure 72 provides heat that is then absorbed via the heat-absorbing surface 50 to the thermo module 74, thus decreasing the temperature of the structure 72.

Because the low and high temperature FBG-mounting structures 78 and 72 are provided adjacently to each other, the heat-conducting portion $T_3$ immediately below the low temperature FBG-mounting structure 78 supplies heat to the heat-conducting portion $T_3$ immediately below the high temperature FBG-mounting structure 72. Heat is thus supplied to always increase the temperature of the heat-absorbing surface 50 and is absorbed to always decrease the temperature of the heat-releasing surface 80. This has been confirmed with the thermal analysis using the finite element method, giving the result that the high- and low-temperature FBG-mounting structures 78 and 72 adjacently provided to each other achieve a higher heat flow rate per unit cross-sectional area substantially perpendicular to the heat flow direction in the heat-conducting portion $T_3$, as described above.

Specifically, when the high temperature FBG-mounting structures 78 are adjacently provided to each other, the portions of the heat-conducting portion that are immediately below both the structures 78 decrease their temperatures, thus providing little heat conduction in the heat-conducting portion. Similarly, when the low temperature FBG-mounting structures 72 are adjacently provided to each other, the portions of the heat-conducting portion that are immediately below both the structures increase their temperatures, thus again providing little heat conduction in the heat-conducting portion.

The heat flow rate per unit cross-sectional area substantially perpendicular to the heat flow direction in the heat-conducting portion $T_3$ refers to the amount of heat conducted from the heat-conducting portion $T_3$ immediately below the low temperature FBG-mounting structure 78 to the heat-conducting portion $T_3$ immediately below the high temperature FBG-mounting structure 72. It has been confirmed, as described above, that the high- and low-temperature FBG-mounting structures 78 and 72 provided adjacent to each other may achieve, compared to the high or low temperature FBG-mounting structures 78 or 72 provided adjacent to each other, a higher heat flow rate per unit cross-sectional area substantially perpendicular to the heat flow direction in the heat-conducting portion $T_3$. Also confirmed is how the heat is supplied from the heat-conducting portion $T_3$ immediately below the low temperature FBG-mounting structure 78 to the heat-conducting portion $T_3$ immediately below the high temperature FBG-mounting structure 72. Specifically, it has been confirmed that the difference in temperature between the heat-releasing surface 80 and the temperature control surface 88, and the difference in temperature between the heat-absorbing surface 50 and the temperature control surface 48 always vary to reduce. The high- and low-temperature FBG-mounting structures 78 and 72 adjacently, i.e. alternately, provided to each other may allow, compared to the high temperature FBG-mounting structures 78 or the low temperature FBG-mounting structures 72 adjacently provided to each other, lower power to be supplied to the thermo module 54 and 74.

Figure 6:
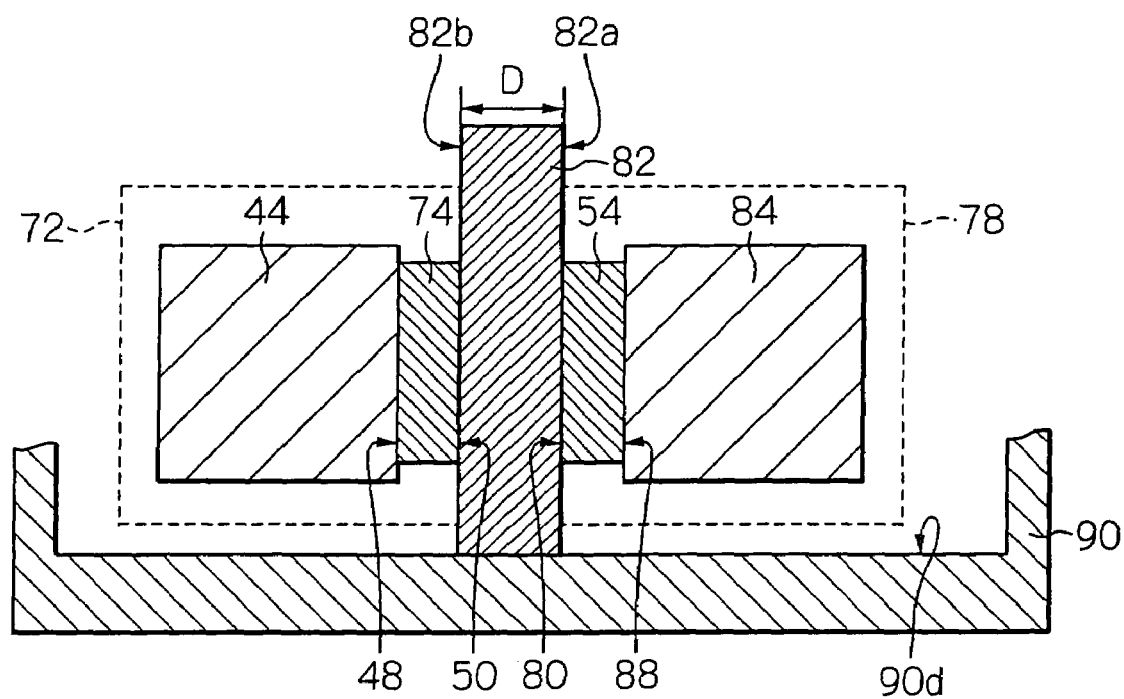
FIG. 6 is a side cross-sectional view of an alternative, second embodiment where the high- and low-temperature FBG-mounting structures are respectively provided on the opposite side walls of a plate-like heat conductor mounted on the inner surface of the bottom of the housing.

With now reference to FIG. 6, an FBG system in an alternative, second embodiment will be described below. FIG. 6 is a cross-sectional side view showing an alternative embodiment where the high- and low-temperature FBG-mounting structures 78 and 72 are respectively provided on the opposite side walls 82a and 82b of a plate heat conductor 82 mounted on the inner bottom surface of a housing 90.

The FBG system in the alternative embodiment includes FBG-mounting structures 72 and 78, a plate-like heat conductor 82 bearing the FBG-mounting structures 72 and 78, and a housing 90 containing the FBG-mounting structures 72 and 78 and the heat conductor 82. The plate-like heat conductor 82 is provided on an inner bottom surface 90d of the housing 90 with both the side walls 82a and 82b of the heat conductor 82 substantially perpendicular to the inner bottom surface 90d. Although in the alternative embodiment shown in FIG. 6, the heat conductor 82 is provided substantially perpendicular to the inner bottom surface 90d, they may not be perpendicular to each other, but it is sufficient for the heat conductor 82, or both the side walls 82a and 82b, to be disposed unparallel to the inner bottom surface 90d, insofar as the FBG-mounting structures 72 and 78 do not directly contact with the inner bottom surface 90d. Also, as described above, both side walls 82a and 82b of the heat conductor 82 may not be parallel to each other.

Although in the FBG system shown in FIG. 6, the FBG-mounting structures 72 and 78 are provided on the opposite side walls of the heat conductor 82 at symmetrical positions, respectively, they may not be provided at symmetrical positions, but may also be provided at positions without aligning their center lines perpendicular to the plate 82 with each other. Note, however, that the FBG-mounting structures 72 and 78 may preferably be provided at symmetrical positions to provide the smallest distance between the heat-releasing surface 80 of the low temperature FBG-mounting structure 78 and the heat-absorbing surface 50 of the high temperature FBG-mounting structure 72.

Also note that both of the side walls 82a and 82b of the heat conductor 82, where provided unparallel to the inner bottom surface 90d, may also be referred to as the heat conductor 82 being provided unparallel to the inner bottom surface 90d.

With reference to FIG. 6, the FBG-mounting structures 72 and 78 are provided on the opposite side walls of the heat conductor 82, respectively. The heat conductor 82 has a thickness D. In that context, when the side walls 82a and 82b are unparallel, the average thickness D. The thickness thus defined can be sufficiently small so that heat released from the low temperature FBG-mounting structure 78 is transferred to the high temperature FBG-mounting structure 72 more efficiently than in the first illustrative embodiment FBG system. The thermal analysis on the basis of the finite element method also has confirmed that the FBG system shown in FIG. 6 achieves even lower power to be supplied to the thermo module 54 and 74 than the FBG system in the first embodiment.

Well, with reference to FIG. 7, a description will be given of an FBG system in a further alternative, third embodiment where four FBG-mounting structures 166-1 through 166-4 are disposed in the housing via a heat conductor 160. In the figure, the present illustrative embodiment has the four FBG-mounting structures 166-1-166-4 provided on the respective walls of the heat conductor 160 which has its cross section of a pentagonal prism-shaped or prismoid-shaped structure.

The FBG system in the third embodiment includes the four FBG-mounting structures 166-1 to 166-4 and the heat conductor 160 bearing those FBG-mounting structures in common. The heat conductor 160 is provided, as in the FBG system in the second embodiment, on an inner bottom surface 102d of a housing 102, which is depicted only partially. The four FBG-mounting structures 166-1 to 166-4 include FBG modules 162-1 to 162-4 and thermo modules 164-1 to 164-4, respectively.

Figure 7:
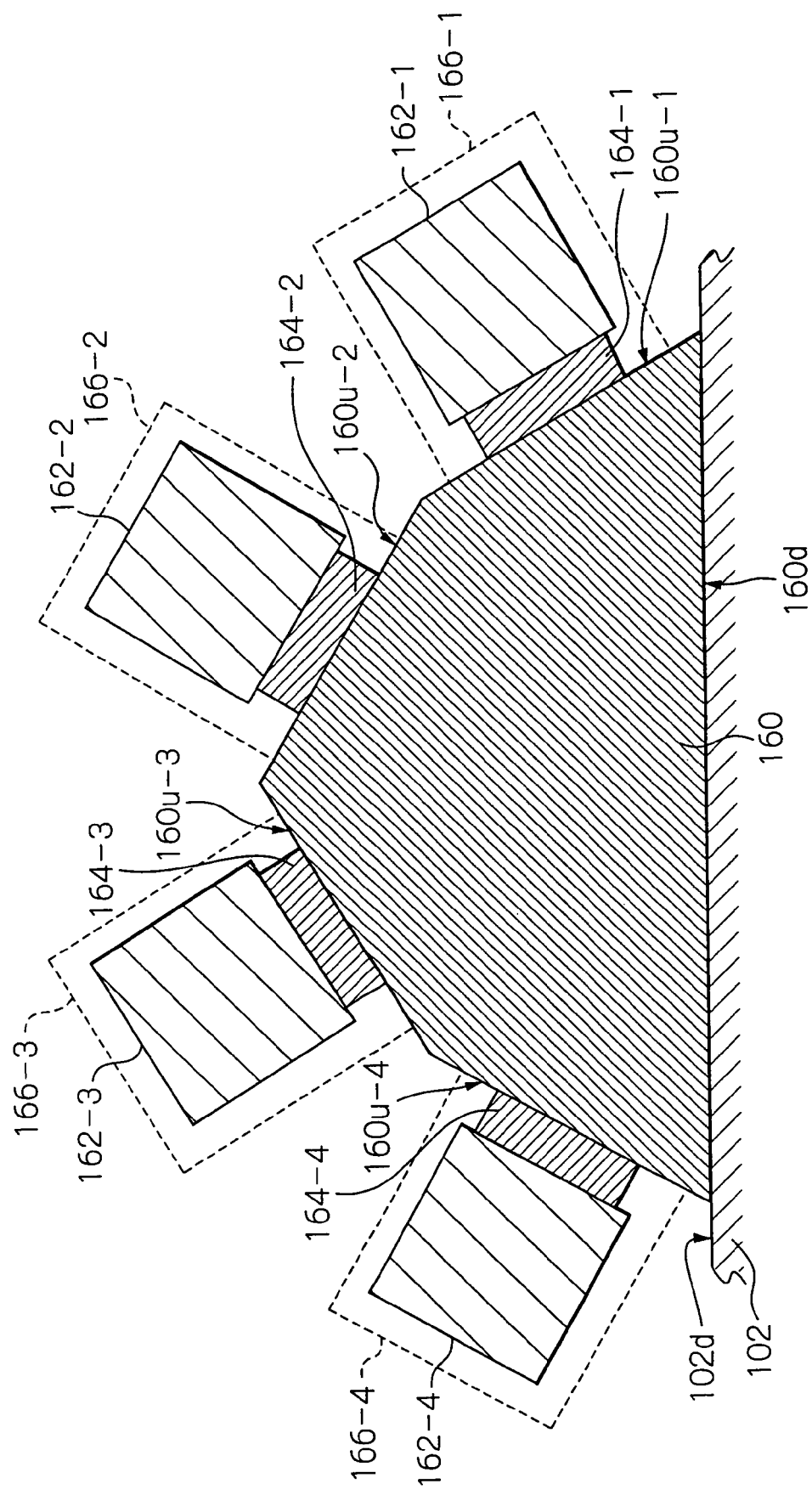
FIG. 7 illustrates, in a cross-sectional view, a further alternative, third embodiment where four FBG-mounting structures are provided on the respective side walls of a pentagonal prism- or prismoid-shaped structure.

Continuing to refer to FIG. 7, the heat conductor 160 is of a pentagonal prism-shaped structure, and the inner bottom portion of the pentagonal prism-shaped structure is shown in the figure. The FBG-mounting structures 166-1 to 166-4 are therefore provided on side walls 160u-1 to 160u-4 of the pentagonal prism-shaped structure 160, respectively. One of the sidewalls of the pentagonal prism-shaped structure forming the heat conductor 160 that is denoted by 160d, the largest side wall, in FIG. 7, is provided in touch with the inner bottom surface 102d of the housing 102.

The FBG-mounting structures 166-1 to 166-4 on the heat conductor 160 may not be provided in parallel. In that case, the heat conductor 160 may not be of the pentagonal prism-shaped structure, but may be a pentagonal prismoid-shaped structure. When the heat conductor 160 is of the pentagonal prismoid-shaped structure, it should be understood that the inner bottom surface portion, i.e. side wall 160d, in FIG. 7, corresponds to the upper or lower bottom surface of the pentagonal prismoid-shaped structure 160.

Adjacent ones of the FBG-mounting structures 166-1 to 166-4 provided on the heat conductor 160 function as a pair of high- and low-temperature FBG-mounting structures. More specifically in the specific embodiment, the FBG-mounting structures 166-1 and 166-3 are the high temperature FBG-mounting structure while the remaining FBG-mounting structures 166-2 and 166-4 are the low temperature FBG-mounting structure. Conversely, the FBG-mounting structures 166-1 and 166-3 may be the low temperature FBG-mounting structure, and the FBG-mounting structures 166-2 and 166-4 may be the high temperature FBG-mounting structure.

In the third embodiment, the thermal analysis using the finite element method has confirmed that, compared to the case where the high temperature FBG-mounting structures adjacently provided to each other and to the case where the low temperature FBG-mounting structure adjacently provided to each other, a higher heat flow rate per unit cross-sectional area substantially perpendicular to the heat flow direction in the heat-conducting portion $T_3$ may be achieved by the high- and low-temperature FBG-mounting structures thus provided adjacent to each other. As in the first embodiment of FBG system, lower power may be supplied to each of the thermo modules 164-1 to 164-4.

The adjacently provided FBG-mounting structures may be arranged much closer to each other than in the first embodiment. Specifically, compared to the FBG-mounting structures when provided in parallel on a plane, the structures provided on the side walls of a polygonal prism-shaped or prismoid-shaped structure shown in FIG. 7 may accomplish a shorter average distance between the heat-releasing surface of the low temperature FBG-mounting structure and the heat-absorbing surface of the high temperature FBG-mounting structure. Compared to the FBG system in the first embodiment, therefore, lower power may be supplied to each thermo module.

Although FIG. 7 shows the FBG system including the four FBG-mounting structures, the heat conductor 160 may be a hexagonal or more polygonal prism-shaped or prismoid-shaped structure to achieve the FBG system including five or more FBG-mounting structures. Even for an odd number of FBG-mounting structures being provided, the high- and low-temperature FBG-mounting structures adjacently provided to each other may achieve lower power to be supplied to the thermo module as described above.

Figure 8A:
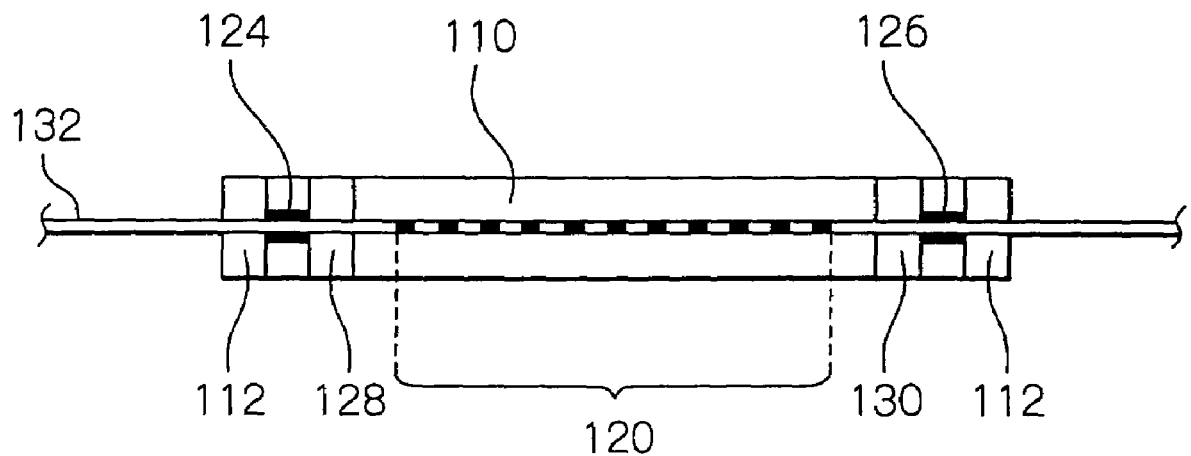
FIG. 8A is a schematic top view showing the configuration of the FBG-mounting structure.
Figure 8B:
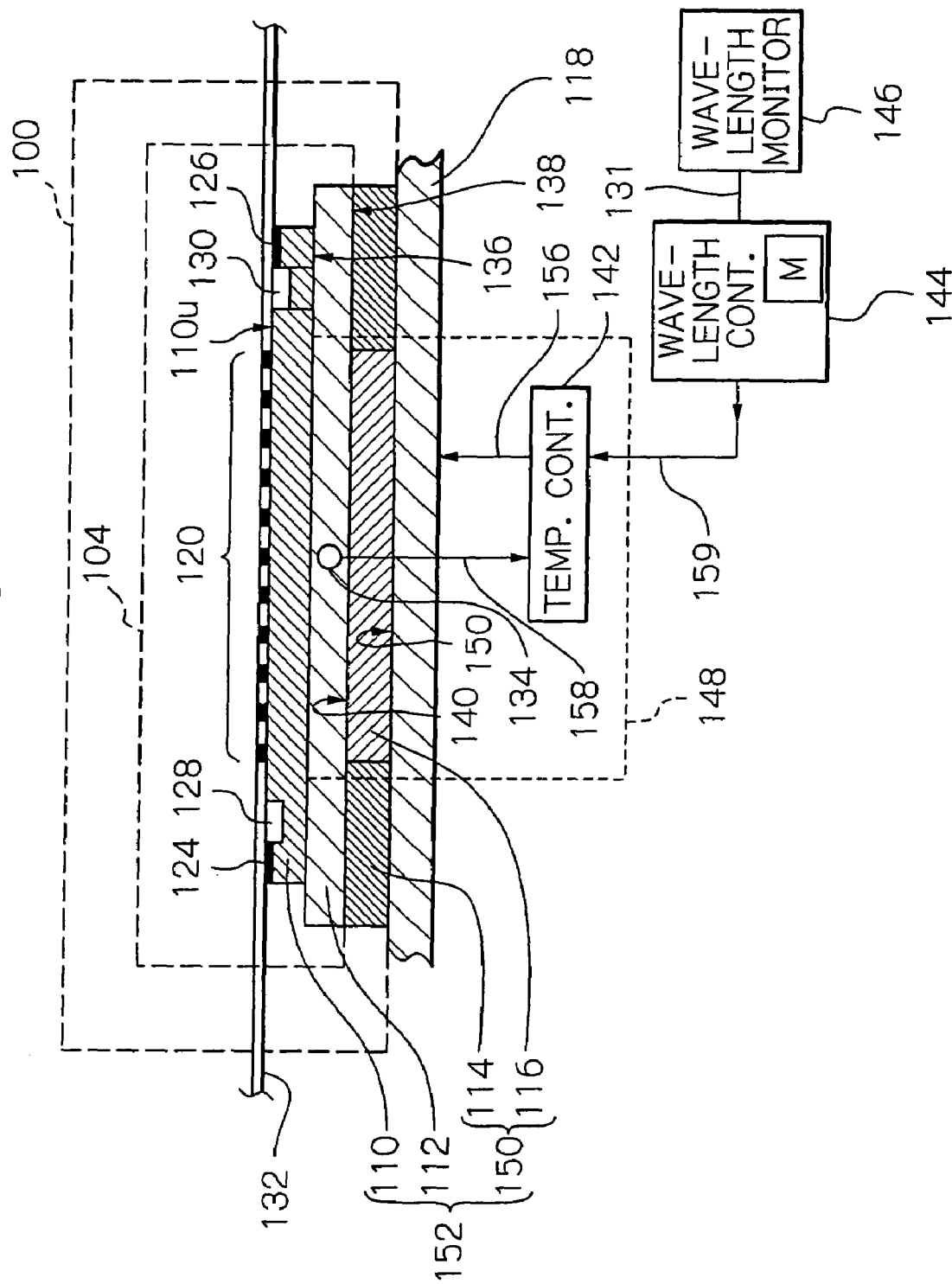
FIG. 8B is a schematic side view showing the configuration of the FBG-mounting structure together with circuit components associated therewith.

With reference to FIGS. 8A and 8B, an illustrative embodiment of the FBG-mounting structure will be described below. FIG. 8A is a schematic plan view of the FBG-mounting structure as viewed from its top. FIG. 8B schematically shows the cross section of the FBG-mounting structure 100 as viewed from its one side together with some constituent circuit elements. From FIG. 8A, omitted are a housing 118, a temperature controller 142, a wavelength controller 144, and a wavelength monitor 146, which are included in FIG. 8B and will be described below.

The FBG-mounting structure 100 includes an FBG module 104 and a temperature control plate 150. The FBG module 104 includes a stack of a mounting plate 110 and a mounting plate holder 112. The mounting plate 110 has an optical fiber 132 on its upper surface. For convenience of the description, a structure that includes a stack of the mounting plate 110, the mounting plate holder 112 and the temperature control plate 150 may hereafter be referred to simply as an FBG mounting base 152.

The mounting plate 110 has an FBG contacting portion 120 on its upper surface in FIG. 8A. The mounting plate 110 also has a first and a second fastening portion 124 and 126 at both end portions of the plate 110 on opposite sides across the FBG contacting portion 120, respectively.

The FBG is formed in the optical fiber 132. The FBG is brought into contact with the FBG contacting portion 120 by the first and second fastening portions 124 and 126 fastening or affixing the optical fiber 132.

The temperature control plate 150 includes a heat insulating member 114 and a thermo module 116. The mounting plate 110 has its lower surface 136 made in contact with the upper surface of the mounting plate holder 112 in a slidable manner. The mounting plate holder 112 has its lower surface 138 fastened in contact with the upper surface of the temperature control plate 150. Although in the first, second and third illustrative embodiments, the FBG-mounting structure is described as including the FBG module and the thermo module, in the FBG system including the FBG-mounting structure shown in FIGS. 8A and 8B, the FBG-mounting structure 100 includes the FBG module 104 and the temperature control plate 150.

The mounting plate holder 112 has a hole 134 which receives a temperature sensor. In the following discussion, the temperature sensor provided in the hole 134 for receiving therein the temperature sensor may also be referred to by the reference numeral 134 without being misconstrued in the context.

The FBG mounting base 152 is fastened on the housing inner bottom surface 154 of the housing 118. The housing inner bottom surface 154 may hereafter be referred to as the heat absorbing and releasing surface. FIG. 8B only shows the inner bottom surface of the housing 118. FIG. 8A is a schematic plan view of the FBG system as viewed from the top, and only shows portions necessary for understanding the configuration of the FBG-mounting structure and omits therefrom other portions such as the housing 118.

The housing 118 may be made of gold-plated copper. The housing 118 may, of course, be made of various materials, such as aluminum and brass, other than copper. The housing 118 is box-like shaped, and has either of its sidewalls in the longitudinal direction of the optical fiber 132 provided with a power supply terminal to the thermo module 116 and an output terminal from the temperature sensor 134, both not shown. The FBG-mounting structure 100 is connected via the terminals to the temperature controller 142. Specifically, a cable 156 for power soppy from the temperature controller 142 to the thermo module 116, and a cable 158 for the output from the temperature sensor 134 to the temperature controller 142 are connected via the terminals provided on that side wall of the housing 118.

Although the heat insulating member 114 is made of glass epoxy, any other low thermal conductivity material such as PEEK (trademark) or mica may be used. The structure shown in FIG. 8B is not a limitation. The heat insulating member 114 may not be used, and instead of the mounting plate holder 112, a screw made of a low thermal conductivity material may be used to bridge-fasten the mounting plate. In that case, the place for reserving the heat-insulating member 114 will be a vacant space, which provides the so-called aerial heat insulation structure.

The thermo module 116 includes a Peltier device, not shown. The heating and cooling may, therefore, be selectable only by switching the direction of current flowing through the Peltier device. Although FIG. 8B shows the embodiment including the single thermo module 116, a plurality of thermo modules 116 may be provided considering the size of the FBG contacting portion 120 or the like. Accordingly, the structure of the temperature controller 142 and the number of terminals to be provided on the side wall of the housing 118 and the like may be modified accordingly, but they are mere design matters.

In the illustrative embodiment, the mounting plate 110 may be made of Invar (trademark) alloy, or FeNi36, as well as glass ceramics or the like. The mounting plate holder 112 may be made of copper, aluminum or the like. The inventors of the present application have experimentally found that the mounting plate 110 made of a material with a thermal expansion coefficient up to $1.2*10^{-6}$/K and the mounting plate holder 112 made of a material with a thermal conductivity down to 398 W/(m·K) will give satisfactory results. In any event, any material that satisfies the above conditions of the thermal expansion coefficient and thermal conductivity may be used, and the selection of the material is a mere matter of design choice.

The mounting plate 110 and the mounting plate holder 112 are both plate-like shaped, and the lower surface 136 of the mounting plate 110, which is the interface between the plate 100 and the plate holder 112, is applied with silicone grease. The mounting plate 110 and the mounting plate holder 112 may thus slide past each other, keeping the good thermal contact therebetween. Specifically, no silicone grease applied would provide poor thermal contact between the mounting plate 110 and the mounting plate holder 112, giving a lower thermal conductivity at the interface therebetween. However, silicone grease applied between the mounting plate 110 and the mounting plate holder 112 will keep the good thermal conductivity.

The mounting plate 110 has its upper surface 110u on which a groove, not shown, having its cross section V-shaped is formed to bring the FBG-formed area of the optical fiber 132 into contact with the upper surface 110u of the mounting plate 110 without loss of thermal conductivity by fitting the optical fiber 132 on the bottom portion of the V-shaped groove. The V-shaped groove is preferably filled with silicone grease to keep the good thermal contact between the optical fiber 132 and the upper surface 110u of the mounting plate 110 via the silicone grease.

In order to provide the first and second fastening portions 124 and 126 at the opposite end portions of the mounting plate 110, a first and a second groove 128 and 130 are provided substantially perpendicular to the V-shaped groove, respectively. Preferably, the first and second grooves 128 and 130 are provided so that the optical fiber 132 may be fastened by the first and second fastening portions 124 and 126 without a wide spread of the fixing agent to clearly define the fastening points or positions of the optical fiber 132.

Under an unstretched and uncompressed state, the optical fiber 132 is fastened at the first and second fastening portions 124 and 126 with ultraviolet (UV) cure acrylic adhesive (Catalog No. VTC-2, Summers Optical, Inc., Hatfield, Pa. 19440, U.S.A.). Adhesives other than the above may be used, such as epoxy adhesive.

In order that the lower surface 136 of the mounting plate 110 is in contact with the upper surface of the mounting plate holder 112 in a slidable manner, and the mounting plate 110, the mounting plate holder 112 and the temperature control plate 150 are integrated into the FBG mounting base 152, the mounting plate holder 112 is screwed on the temperature control plate 150 with set screws.

In the illustrative embodiment, a thermistor is employed for the temperature sensor 134. However, other kinds of temperature sensor may be used such as a thermocouple or a platinum thermal resistance. Although in this embodiment the temperature sensor 134 is inserted into the hole cut in the mounting plate holder 112, the sensor 134 may be adhered to a side face of the mounting plate holder 112 or the like. These are mere design matters.

The FBG-mounting structure according to the invention may be used in an encoder or decoder. Assuming now the FBG-mounting structure is for use in a decoder, a description will be made of the principle of the temperature control of an operating wavelength. The FBG-mounting structure may of course be used in an encoder based on the same operating principle.

The wavelength monitor 146, which corresponds to the element 30, FIG. 1, measures the degree of an autocorrelation, i.e. the amplitude of an eye opening, of the optical pulse signal 29 transmitted to the receiver section 40. The wavelength controller 144, which corresponds to the element 32, FIG. 1, receives an output 131 from the wavelength monitor 146 and supplies a control signal 159 to the temperature controller 142 of the temperature controller 148. The output 131 from the wavelength monitor 146 is of an electric signal that reflects the degree of the autocorrelation, or the amplitude of the eye opening, of the optical pulse signal transmitted to the receiver section 40. In the wavelength controller 144, a storage system denoted by M in the figure stores a temperature measured by the temperature sensor 134 and the relationship of the temperature with the FBG operating wavelength or the like. The stored information is used for the operation of producing the control signal 159 to be sent to the temperature controller 142 based on the output 131 from the wavelength monitor 146 or the like.

The temperature controller 142 uses the control signal 159 and the signal 158 on temperature from the temperature sensor 134 to provide the temperature control signal 156 to the thermo module 116, which corresponds to the element 66, FIG. 1. In this manner, in order to bring the temperature measured by the temperature sensor 134 to be equal to the set temperature value given by the temperature controller 142, the FBG contacting portion 120 is heated or cooled by the thermo module 116 via the mounting plate holder 112.

The thermo module 116 heats or cools the mounting plate holder 112, which in turn heats or cools, via the lower surface 136 of the mounting plate 110 in thermal contact therewith, the mounting plate 110. The mounting plate holder 112 and the mounting plate 110 are not mechanically or firmly fastened to, but in contact via silicone grease with, each other so that the expansion or contraction of the mounting plate holder 112 due to the heating or cooling by the thermo module 116 is not transferred to the mounting plate 110. Because the mounting plate 110 is made of a low thermal expansion coefficient material, the mounting plate 110 itself will hardly expand or contract.

Because the FBG incorporated in the optical fiber 132 is fastened at the first and second fastening portions 124 and 126 at the opposite ends of the mounting plate 110, a temperature change of the mounting plate 110 may cause the temperature of the portion where the optical fiber 132 is in contact with the FBG contacting portion 120 to change.

Although a change in ambient temperature surrounding the FBG-mounting structure 100 causes the housing 118 to expand or contract, the flexibility of the sealant filled in a gap between a through-hole on the housing 118 and the optical fiber 132 causes the expansion and contraction of the housing 118 to be absorbed by the sealant, thus preventing the expansion and contraction to be transferred to the optical fiber 132. The expansion and contraction of the housing 118 thus applies no stress to the optical fiber 132 fastened on the first and second fastening portions 124 and 126. The FBG incorporated in the optical fiber 132 thus experiences no operating wavelength variation which would otherwise be caused by such a stress. Even when the FBG experiences no stress, a change in temperature will cause the operating wavelength to vary.

The inventors of the present application have experimentally and successfully manufactured, using a temperature controller that can set temperature with an increment of 0.1 degree centigrade, an FBG-mounting structure that can change the operating wavelength to any wavelength value with an adjustable width for operating wavelength equal to 200 pm or more and with an accuracy of 1 pm.

Note that, in FIGS. 4A through 7, the high temperature FBG-mounting structure 72, the low temperature FBG-mounting structure 78, and the FBG-mounting structures 166-1, 166-2, 166-3 and 166-4 are simplified forms of the FBG-mounting structure 100 shown in FIG. 8. The thermo modules 54, 66, 74, 164-1, 164-2, 164-3 and 164-4 correspond to the thermo module 116 shown in FIG. 8.

The entire disclosure of Japanese patent application No. 2006-157116 filed on Jun. 6, 2006, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A fiber Bragg grating system including a plurality of fiber Bragg grating mounting structures and a housing containing said plurality of fiber Bragg grating mounting structures,
   each of said plurality of fiber Bragg grating mounting structures comprising a fiber Bragg grating module mounted with a fiber Bragg grating, and a thermo module for supplying or absorbing heat from said fiber Bragg grating module,
   said plurality of fiber Bragg grating mounting structures being provided in parallel on an inner bottom surface of a heat-conducting portion which is part of said housing,
   ones of said plurality of fiber Bragg grating mounting structures which are disposed adjacent to each other having temperature values set such that one is lower than an environmental temperature and another is higher than the environmental temperature.

2. The system in accordance with claim 1, wherein the temperature value is set substantially equal to a temperature of said fiber Bragg grating which is measured in operation when said fiber Bragg grating system outputs a Bragg reflected light of a wavelength as designed and modulates a phase of input light as designed to output.

3. The system in accordance with claim 1, wherein said fiber Bragg grating module comprises a mounting plate having an upper surface, a lower surface and opposite end portions, and a mounting plate holder having a lower surface;
   each of said plurality of fiber Bragg grating mounting structures comprising:
   a temperature control plate comprising a heat insulating member, and having a temperature control surface and a heat absorbing and releasing surface opposite to the temperature control surface, said thermo module being included in said temperature control plate; and
   a temperature sensor for sensing a temperature of said mounting plate,
   said mounting plate having a fiber Bragg grating contacting portion formed on the upper surface, and a first fastening portion and a second fastening portion formed correspondingly at the opposite end portions across said fiber Bragg grating contacting portion,
   said fiber Bragg grating being fastened on said first fastening portion and said second fastening portion to be in contact with said fiber Bragg grating contacting portion,
   the lower surface of said mounting plate being slidably in contact with the upper surface of said mounting plate holder,
   the lower surface of said mounting plate holder being fastened in contact with the temperature control surface of said temperature control plate,
   the heat absorbing and releasing surface of said temperature control plate being fastened in contact with a surface of said heat-conducting portion or a side wall of said heat conductor.

4. The system in accordance with claim 1, further comprising a temperature controller for controlling a temperature of said fiber Bragg grating mounting structures.

5. A fiber Bragg grating system including two fiber Bragg grating mounting structures and a housing containing said fiber Bragg grating mounting structures,
   each of said fiber Bragg grating mounting structures comprising a fiber Bragg grating module mounted with a fiber Bragg grating, and a thermo module for supplying or absorbing heat from said fiber Bragg grating module, a plate heat conductor being provided on an inner bottom surface of said housing, and having both side walls unparallel to said inner bottom surface, each of said two fiber Bragg grating mounting structures being provided on corresponding one of both side walls of said heat conductor, said fiber Bragg grating mounting structures having temperature values set such that one is lower than an environmental temperature and another is higher than the environmental temperature.

6. The system in accordance with claim 5, wherein the temperature value is set substantially equal to a temperature of said fiber Bragg grating which is measured in operation when said fiber Bragg grating system outputs a Bragg reflected light of a wavelength as designed and modulates a phase of input light as designed to output.

7. The system in accordance with claim 5, wherein said fiber Bragg grating module comprises a mounting plate having an upper surface, a lower surface and opposite end portions, and a mounting plate holder having a lower surface;

each of said two fiber Bragg grating mounting structures comprising:

a temperature control plate comprising a heat insulating member, and having a temperature control surface and a heat absorbing and releasing surface opposite to the temperature control surface, said thermo module being included in said temperature control plate; and a temperature sensor for sensing a temperature of said mounting plate, said mounting plate having a fiber Bragg grating contacting portion formed on the upper surface, and a first fastening portion and a second fastening portion formed correspondingly at the opposite end portions across said fiber Bragg grating contacting portion, said fiber Bragg grating being fastened on said first fastening portion and said second fastening portion to be in contact with said fiber Bragg grating contacting portion, the lower surface of said mounting plate being slidably in contact with the upper surface of said mounting plate holder, the lower surface of said mounting plate holder being fastened in contact with the temperature control surface of said temperature control plate, the heat absorbing and releasing surface of said temperature control plate being fastened in contact with a surface of said heat-conducting portion or a side wall of said heat conductor.

8. The system in accordance with claim 5, further comprising a temperature controller for controlling a temperature of said fiber Bragg grating mounting structures.

9. A fiber Bragg grating system including a plurality of fiber Bragg grating mounting structures and a housing containing said plurality of fiber Bragg grating mounting structures, each of said plurality of fiber Bragg grating mounting structures comprising a fiber Bragg grating module mounted with a fiber Bragg grating, and a thermo module for supplying or absorbing heat from said fiber Bragg grating module, a polygonal prism-shaped heat conductor being provided on an inner bottom surface of said housing, and having a plurality of side walls, each, of said plurality of FBG-mounting structures being provided on corresponding one of the plurality of side walls, ones of said plurality of fiber Bragg grating mounting structures which are disposed adjacent to each other having temperature values set such that one is lower than an environmental temperature and another is higher than the environmental temperature.

10. The system in accordance with claim 9, wherein the temperature value is set substantially equal to a temperature of said fiber Bragg grating which is measured in operation when said fiber Bragg grating system outputs a Bragg reflected light of a wavelength as designed and modulates a phase of input light as designed to output.

11. The system in accordance with claim 9, wherein said fiber Bragg grating module comprises a mounting plate having an upper surface, a lower surface and opposite end portions, and a mounting plate holder having a lower surface;

each of said plurality of fiber Bragg grating mounting structures comprising:

a temperature control plate comprising a heat insulating member, and having a temperature control surface and a heat absorbing and releasing surface opposite to the temperature control surface, said thermo module being included in said temperature control plate; and a temperature sensor for sensing a temperature of said mounting plate, said mounting plate having a fiber Bragg grating contacting portion formed on the upper surface, and a first fastening portion and a second fastening portion formed correspondingly at the opposite end portions across said fiber Bragg grating contacting portion, said fiber Bragg grating being fastened on said first fastening portion and said second fastening portion to be in contact with said fiber Bragg grating contacting portion, the lower surface of said mounting plate being slidably in contact with the upper surface of said mounting plate holder, the lower surface of said mounting plate holder being fastened in contact with the temperature control surface of said temperature control plate, the heat absorbing and releasing surface of said temperature control plate being fastened in contact with a surface of said heat-conducting portion or a side wall of said heat conductor.

12. The system in accordance with claim 9, further comprising a temperature controller for controlling a temperature of said fiber Bragg grating mounting structures.

13. A fiber Bragg grating system including a plurality of fiber Bragg grating mounting structures and a housing containing said plurality of fiber Bragg grating mounting structures, each of said plurality of fiber Bragg grating mounting structures comprising a fiber Bragg grating module mounted with a fiber Bragg grating, and a thermo module for supplying or absorbing heat from said fiber Bragg grating module, a polygonal prismoid-shaped heat conductor being provided on an inner bottom surface of said housing, and having a plurality of side walls, each of said plurality of FBG-mounting structures being provided on corresponding one of the plurality of side walls, ones of said plurality of fiber Bragg grating mounting structures which are disposed adjacent to each other having temperature values set such that one is lower than an environmental temperature and another is higher than the environmental temperature.

14. The system in accordance with claim 13, wherein the temperature value is set substantially equal to a temperature of said fiber Bragg grating which is measured in operation when said fiber Bragg grating system outputs a Bragg reflected light of a wavelength as designed and modulates a phase of input light as designed to output.

15. The system in accordance with claim 13, wherein said fiber Bragg grating module comprises a mounting plate having an upper surface, a lower surface and opposite end portions, and a mounting plate holder having a lower surface;

each of said plurality of fiber Bragg grating mounting structures comprising:

a temperature control plate comprising a heat insulating member, and having a temperature control surface and a heat absorbing and releasing surface opposite to the temperature control surface, said thermo module being included in said temperature control plate; and a temperature sensor for sensing a temperature of said mounting plate, said mounting plate having a fiber Bragg grating contacting portion formed on the upper surface, and a first fastening portion and a second fastening portion formed correspondingly at the opposite end portions across said fiber Bragg grating contacting portion, said fiber Bragg grating being fastened on said first fastening portion and said second fastening portion to be in contact with said fiber Bragg grating contacting portion, the lower surface of said mounting plate being slidably in contact with the upper surface of said mounting plate holder, the lower surface of said mounting plate holder being fastened in contact with the temperature control surface of said temperature control plate, the heat absorbing and releasing surface of said temperature control plate being fastened in contact with a surface of said heat-conducting portion or a side wall of said heat conductor.

16. The system in accordance with claim 13, further comprising a temperature controller for controlling a temperature of said fiber Bragg grating mounting structures.

* * * * *